Aug. 14, 1928.
R. E. HELLMUND
1,680,414
MOTOR CONTROL SYSTEM
Filed Aug. 17, 1920
3 Sheets-Sheet 1
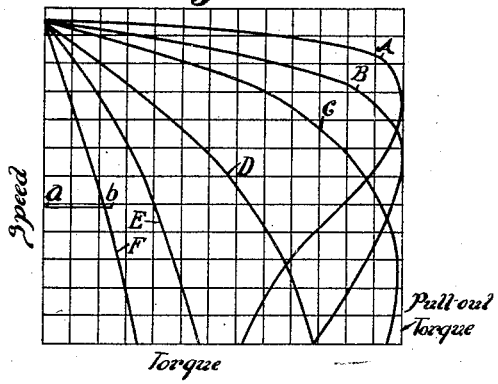
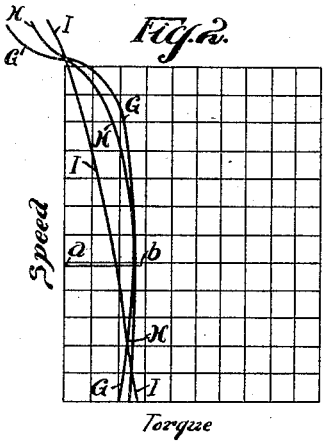
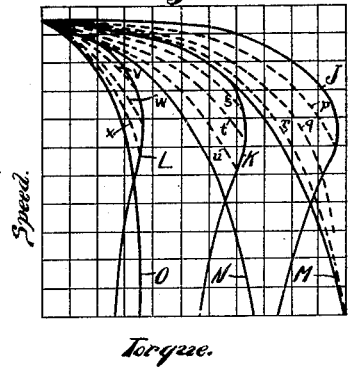
WITNESSES:
INVENTOR
Rudolf E. Hellmund.
BY
Wesley G. Carr
ATTORNEY

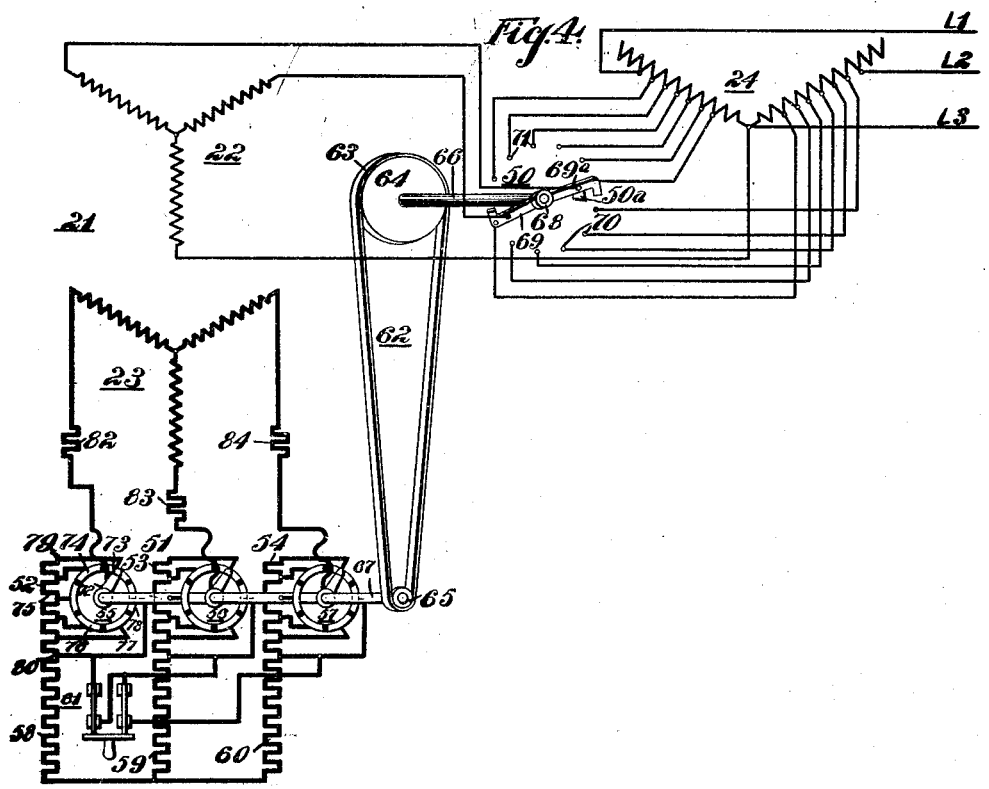

Aug. 14, 1928.
R. E. HELLMUND
1,680,414
MOTOR CONTROL SYSTEM
Filed Aug. 17, 1920
3 Sheets-Sheet 3
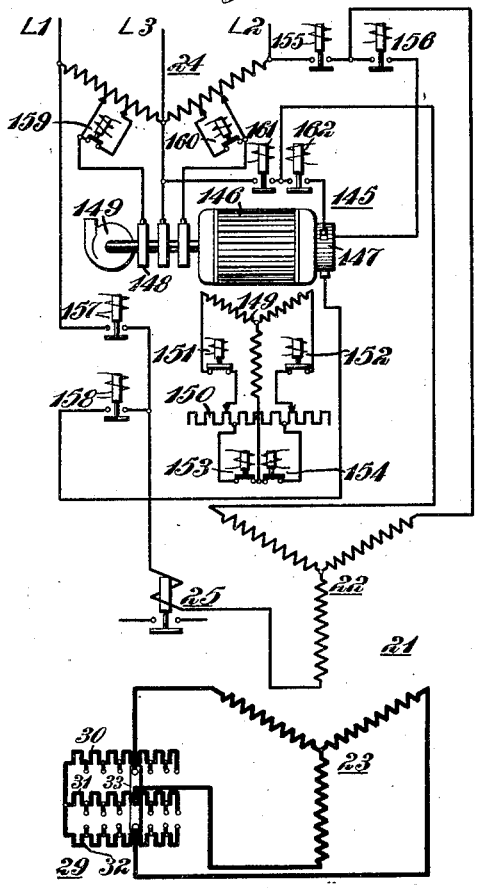
WITNESSES
J.P. Wurmb
W.R. Coley
INVENTOR
Rudolf E. Hellmund.
BY
Wesley G. Carr
ATTORNEY Patented Aug. 14, 1928.

1,680,414

UNITED STATES PATENT OFFICE.

RUDOLF E. HELLMUND, OF SWISSVALE, PENNSYLVANIA, ASSIGNOR TO WESTINGHOUSE ELECTRIC & MANUFACTURING COMPANY, A CORPORATION OF PENNSYLVANIA.

MOTOR-CONTROL SYSTEM.

Application filed August 17, 1920. Serial No. 404,148.

My invention relates to systems of control for dynamo-electric machines and it has special relation to the control of induction motors for oil-well drilling purposes and the like.

To successfully accomplish the drilling of an oil or gas well by means of an electric drive, a motor with drooping speed characteristics is required. After the tool has been lifted, the motor should speed up quickly in order to permit the tool to drop freely and thus obtain the most rapid drilling of the well. This condition is difficult to fulfill with an ordinary electric motor because its large armature inertia tends to prevent quick speed changes. Up to the present time, wound-secondary induction motors, having the usual speed-torque characteristics, have been employed but have not afforded satisfactory operation.

It is one object of my invention, therefore, to provide a novel induction-motor-control system wherein the operating characteristics of the motor correspond to the desired alternate lifting and free release of the drilling tool.

Another object of my invention is to provide a system of the above-indicated character wherein the primary-voltage connections and the secondary-resistance connections are adjusted at will to provide the desired operating characteristics.

A further object of my invention is to provide a system for oil-well drilling wherein the motor connections are so varied as to obtain a predetermined ratio between the tool-lifting torque and the maximum torque of the motor.

Still another object of my invention is to provide a system of the character set forth and embodying a single induction motor together with means for changing the motor characteristics during the "up" and the "down" strokes of the tool, respectively.

Other specific objects of my invention will become evident from the following detailed description, taken in conjunction with the accompanying drawings, wherein Fig. 1 and Fig. 2 are curve charts setting forth the operation of induction motors under various operating conditions;

Fig. 3 is another curve chart corresponding to the operation of a control system that is diagrammatically illustrated in Fig. 4;

Fig. 5 illustrates a modified form of control system organized in accordance with my invention, and Fig. 6 is a diagrammatic view of an auxiliary system for governing the main circuits of Fig. 5 in accordance with a predetermined sequence.

Referring to Figs. 1 and 2 of the drawings, the wound secondary induction motors that have previously been employed in electric oil-well drilling, so far as I am aware, have all possessed speed-torque characteristics such as the curves A to F that are shown in Fig. 1. The "pull-out" or maximum torque of the motor must be comparatively high in order to provide the necessary power for such heavy operations as pulling casing, although the actual drilling torque that is required is rather low, as represented by the horizontal line $a-b$ in Fig. 1, which corresponds to the operation of the motor in accordance with curve F.

When operating along curve F, the motor torque diminishes rather quickly as the motor speeds up, and this decreased torque in turn is not sufficient to rapidly accelerate the rotor. Consequently, it is desirable to provide a motor having an operating curve similar to curve G in Fig. 2, in which case the drilling torque, represented by the horizontal line $a-b$, is maintained practically constant over a considerable speed range. Such a curve may be obtained by concurrently reducing the motor primary voltage and properly adjusting the secondary resistance during the drilling periods. In fact, it is possible by a judicious choice of combined primary-voltage and secondary-resistance regulation, to obtain various desirable speed-torque characteristics.

For example, if it should prove that curve G of Fig. 2 is too steep for satisfactory operation, a slight addition of secondary resistance will provide a curve such as that designated by H. In this connection, it may even be found to be advisable to adjust the maximum motor torque to be somewhat less than that necessary for lifting the drilling tool and depend upon the inertia of the armature to accomplish a portion of the work during the lifting periods.

When operating in accordance with curves such as that shown in Fig. 2, the further advantage obtains that it is not only possible to secure the desired speed range for each stroke, but it is also possible to shift the average speed as desired and, moreover, avoid regeneration during the downward stroke, which has been a disadvantageous feature of some of the prior electric equipments, by reason of the retarding effect upon the dropping tool.

It should be noted that in actual practice, fine gradations of control are desirable and for this purpose, an induction regulator for the primary-voltage control and a liquid rheostat for the secondary-resistance control may be employed to advantage.

Primary-voltage control of the illustrated motor is desirable, not only for reasons previously pointed out but also in connection with high-speed operations, such as bailing and pulling casing, the lower speed, corresponding to the larger number of primary poles, being best adapted for the drilling operation proper. At times during oil well drilling, such as when pulling casing, very large torques are required for short intervals of time, which requires a relatively large amount of power. With the illustrated voltage-control system available, it is possible to use a much smaller motor to provide the necessary large capacity, by merely increasing its torque temporarily. Furthermore, the voltage may be so adjusted during the remainder of the operations as to provide high power-factors and efficiencies.

It should be noted that, according to my invention, a single motor may be employed for effecting both drilling and subsequent pumping operations, and that the motor may be "forced" at will during the drilling period, that is, the motor voltage may be temporarily increased above the line voltage, if necessary, by reason of the line connections to intermediate points of the starting transformer coils.

The performance of the motor will be satisfactory during the drilling operation also, if working along curve G of Fig. 2, because the power-factor will approximate the maximum possible value for any motor that is being operated through the range between the maximum and the no-load torque. Moreover, the fact that a reduced voltage is employed during drilling decreases the magnetizing current that is required and thus further improves the power-factor.

The system that is shown in Fig. 4, for example, embodies the desired primary-voltage and secondary-resistance control through the agency of a single operating handle or lever. Furthermore, a more gradual control is provided by employing relatively large voltage increases or steps from the supply transformer concurrently with relatively small variations of secondary resistance between such steps. The relative control arrangements may be such that the maximum secondary resistance is always inserted in circuit as the change from a lower to a higher voltage step from the primary winding is taken and the resistance is gradually cut out to provide the desired fine regulation.

Fig. 3 indicates three main or solid-line curves J, K and L, applying to three different voltages with minimum resistance in the secondary-winding circuit. The remaining solid line curves M, N and O correspond to similar voltages with maximum secondary-circuit resistance. The dotted curves $p$ to $x$, inclusive, are shown to indicate the intermediate motor characteristics corresponding to the intermediate secondary-resistance values.

The resistance design may be made such that the curve corresponding to the minimum resistance for one voltage step practically coincides over a wide range with the maximum resistance curve for the next higher voltage step. It is thus possible to obtain very fine regulation with a small number of voltage and resistance steps, if desired, for the speed ranges that are required for drilling purposes.

Referring to Fig. 4, the system here shown comprises the induction motor 21 having the primary and the secondary windings 22 and 23, respectively, and the supply transformer 24, with which is associated a novel form of switching device 50 for a purpose to be set forth. A rheostat 51 for the secondary-winding circuit comprises a plurality of sub-divided resistors 52, 53 and 54 that correspond to the respective secondary phases, and a plurality of rotary switching devices 55, 56 and 57 are employed for varying the active value of the resistors step by step. A plurality of supplementary resistors 58, 59 and 60 are connected in series relation with the sub-divided resistors 52, 53 and 54, respectively, and are shown as short-circuited by means of a single throw double-pole switch 61, as will be evident without detailed description. The closed switch also acts as the common "star-point" or neutral connection for the upper resistors 52, 53 and 54.

A differential speed mechanism 62 is provided between the operating device 50 for the supply transformer 24 and the rotary switching devices 55, 56 and 57. This differential device may comprise a belt 63 or the like that passes over a relatively large-diameter pulley or drum 64 and a relatively small-diameter pulley or drum 65, which are respectively affixed to operating shafts 66 and 67 of the switching devices 50 and 55, 56 and 57 for the primary-voltage and the secondary-resistance control, respectively.

The switching device 50 may comprise an insulating knob or operating handle 68, which is suitably attached to a plurality of operating arms 69 and 69a that respectively correspond to the two coils of the supply transformer 24. The arms 69 and 69a are illustrated as extending in substantially opposite directions and a stop member 50a is provided for limiting the movement of the switching device in either direction. The switching arm 69 is thus adapted to successively pass over a plurality of stationary terminals or contact members 70 for gradually increasing the voltage applied from the right-hand coil of the supply transformer 24, while the other switching arm 69a is adapted to pass over a corresponding number of stationary contact terminals 71, which are respectively connected to suitable-tap points on the left-hand transformer coil.

The rotary switching devices 55 to 57, inclusive, are similar in construction and each comprises a rotatable switching arm 72 which is adapted to pass over a plurality of circumferentially-positioned contact segments or arcuate members 73 to 78, inclusive, which are assembled in a complete ring, being suitably insulated, the one from the other. The segment 73 is connected to the upper or maximum resistance terminal of the secondary resistor 52, while the segment 78 is connected to the lower or minimum resistance terminal 80 of the resistor. The intermediate contact segments are connected in rotation to the successive tap-points on the resistor 52, as will be understood.

The design and arrangement of parts is such that, upon rotative movement of the handle member 68 for the switching device 50, the resistors 52, 53 and 54 are gradually excluded from circuit as the switching arms 69 and 69a approach the next higher voltage taps on the respective supply transformer coils. This result is readily accomplished by reason of the provision of the differential speed mechanism 62, as will be understood. Furthermore, just before the switching arms 69 and 69a reach the contact terminal corresponding to the next higher voltage taps, all of the resistance is cut out of the circuit and, as the taps are reached, the maxmum resistance is again connected in circuit by reason of the adjacent positions of the maximum and the minimum contact segments 73 and 78 in the rotary switch 55, for example.

In some cases, it appears advisable to employ the secondary resistors 58, 59 and 60, which are of approximately the same value as the sub-divided resistors 52, 53 and 54, whereby the necessity of adding a great many more steps to the main controller is avoided, since these steps might otherwise be needed to take care of a few exceptional conditions. Furthermore, by opening the switch 61, to open the star connection for the upper resistors 52, 53 and 54 and to insert the resistors 58, 59 and 60 in circuit, the characteristics of all the motor curves may be changed from convex to fairly straight lines, in case the latter shape should be found more desirable in any given oil-well installation.

In addition, it may be advisable to insert the permanent resistors 82, 83 and 84, of relatively low value, in the secondary-winding phases, so as to produce a starting torque on the high speed curves that is near the maximum torque value.

Instead of using the mechanism shown in Fig. 4 to obtain the desired differential-speed control, a single controller 90, such as that shown in Fig. 5, may be employed, if desired. The controller 90 comprises a suitable top cover member or plate 91, a base or bottom plate 92, a rear or frame member 93 and a curved front cover member 93a, in accordance with familiar control practice.

A control drum 94 of any well-known type is located near one side of the controller casing, being mounted upon a suitable operating shaft 95. This drum corresponds to the switching device 50 and is adapted to control the primary voltage of the induction motor. A second drum 96, which is mounted upon a suitable shaft 97, corresponds to the rotary switching devices 55, 56 and 57 of Fig. 4, being thus adapted for secondary-resistance control. To provide the desired differential speed, a relatively large gear-wheel 98 and a relatively small gear-wheel or pinion 99 are secured to the operating shafts 95 and 97, respectively, just above the drums 94 and 96.

A common operating handle 100 is attached to the upper end of the shaft 95, outside of the controller casing. Thus, movement of the single handle 100 causes the desired concurrent control of the primary voltage and of the secondary resistance, as was accomplished by turning the handle member 68 in the system shown in Fig. 4.

It will be understood that suitable finger-boards 101, bearing the desired number of control fingers 102, are provided in connection with each of the control drums 94 and 96. The ratio of the gear wheels 98 and 99 is, of course, such that one complete revolution of the resistance-controlling drum 96 corresponds to that portion of the rotation of the other drum 94 that represents the movement from one voltage tap to the next of the supply transformer 24.

For accomplishing the reversal of the motor, and also a change from one speed to another by adjusting the number of motor poles, a further control drum 103 may be mounted upon a shaft 104 within the controller casing, while a suitable operating lever 105 is attached to the upper end of the shaft. A suitable finger-board and number of control fingers 107 are provided for the desired purpose.

Referring to Fig. 5, the control system shown permits the adjustment of both the speed-torque characteristic and no-load speed and comprises the supply transformer 24 and a frequency-changer 145 that is interposed between the supply transformer 24 and the primary winding 22 of the induction motor 21, together with a plurality of switches or contactors 151 to 162 inclusive.

The frequency-changer 145 is preferably of the self-propelling type having a three-phase rotor 146 connected to the supply conductors L1, L2 and L3, and a three-phase stator winding 149 connected to an adjustable resistor 150, normally closed switches 151 and 152 being included in two of the phases. A plurality of switches 153 and 154 normally short-circuit two intermediate sections of the resistor 150, for a purpose to be set forth.

The rotor winding 146 of the frequency-changer 145 is provided with a three-phase commutator 147, corresponding to secondary or delivered frequency, and a set of three slip-rings 148 that are located at opposite ends of the rotor winding and correspond to primary or applied frequency in accordance with a familiar practice. In order to render the frequency-changer speed quickly responsive to variations of the stator resistor 150, a mechanical load, such as a fan or blower 149 for ventilating the driving motor 21, for example, may be employed.

The arrangement of the circuits is such that the frequency-changer 145 may be employed during the drilling periods, while the main motor 21 may be directly connected to the supply circuit for high-speed operation, such as bailing and pulling, although, of course, the motor may, if desired, be connected through the supply transformer 24 during the latter operations.

An extended description of the operation of the frequency-changer is believed to be unnecessary and it will be sufficient to state here that the secondary frequency, that is the frequency delivered from the commutator 147, is varied by means of the stator resistor 150. By such adjustment, the no-load speed of the induction motor 21 may be varied as desired. The secondary-circuit resistors 30, 31 and 32 for the induction motor 21 may be adjusted to obtain the desired speed-torque curves, while primary-voltage regulation, through the medium of the frequency-changer, permits an adjustment of the maximum torque of the induction motor 21 to any desirable value.

The previously-described current relay 25 is connected in one phase of the primary induction motor winding 22 for controlling the resistor-governing switches 153 and 154, or the stator-energizing switches 151 and 152, or the variable-voltage switches 159 and 160, or all of these sets of switches. It will be appreciated that a secondary voltage relay may be employed in lieu of the current relay 25, if desired, for reasons previously pointed out. In actual practice, suitable preventive coils or resistors will, of course, be utilized in connection with the switches 159 and 160 to prevent an actual short-circuit of sections of the transformer, but it is not deemed necessary for the purposes of the present invention to complicate the drawings by adding such devices.

Referring to Fig. 6, the auxiliary system shown comprises the step-down transformer 35 for supplying a suitably low voltage to the actuating coils of the various illustrated switches, and a master controller 164, similar to the previously-described controller 38, for co-operating with the current relay 25 to govern certain of the actuating coils and for directly controlling the remaining coils.

Assuming that "high-speed" motor operation for bailing or pulling purposes is desired, the master controller 164 is thrown to its "high-speed" position, whereby a circuit is established from one terminal of the secondary transformer winding 37 through control fingers 165 and 166, which are bridged by contact segment 167 of the master controller, conductor 168, parallel-related actuating coils of the switches 155, 157 and 161, and thence through conductor 169 to the opposite terminal of the transformer winding 37.

The closure of these switches directly connects the primary induction-motor winding 22 to the three-phase supply lines L1, L2 and L3, as will be evident, without detailed tracing, in Fig. 14. The secondary-circuit rheostat 29 may, of course, be varied, if desired, to adjust the speed-torque characteristics of the motor during the "high-speed" period.

For "low-speed" or drilling operation, the master controller 164 is thrown to "low-speed" position, whereupon a circuit is established from one terminal of the transformer winding 37 through control fingers 165 and 170, which are bridged by contact segment 171 of the master controller, conductor 172, parallel-related actuating coils of the switches 156, 158 and 162 and thence through conductor 169 to the opposite terminal of the transformer winding 37.

The primary winding 22 of the induction motor 21 is thus connected to the three brushes that bear upon the commutator 147 of the frequency-changer, whereby the energy for driving the induction motor 21 is entirely derived through the frequency changer.

For shifting the no-load speeds up and down during every cycle, as previously set forth, that is, increasing the speed while the tool is dropping and decreasing the speed while the tool is being lifted, the current relay 25 is employed. It will be noted that while the tool is being dropped, that is under relatively low-current conditions, the current relay 25 will be in its lower or circuit-closing position, whereby the actuating coils of the switches 153 and 154 will be energized, provided that the hand switch 173 occupies its closed position. The energization of these coils and the consequent lifting of switches 153 and 154 inserts additional sections of the stator resistor 150 in circuit to effect the desired result of increasing the speed and the frequency of the frequency-changer.

While the tool is being lifted, that is, under relatively high-current conditions, the current relay 25 will be raised to its upper or circuit-opening position, whereby the actuating coils of the switches 153 and 154 will be deenergized to exclude the corresponding sections of resistor 150 from the stator circuit of the frequency changer, thereby decreasing its speed and frequency and effecting a corresponding reduction in speed of the motor 21. In some cases, it may be desirable to entirely open the circuit of the stator winding 149 of the frequency-changer, that is, insert an infinite resistance in the stator circuit, rather than varying the resistor 150. In this case, the switch 173 may be opened and the switch 175 may be closed in the system shown in Fig. 6, whereby the actuating coils of the switches 151 and 152 are energized to lift the switches and effect the desired circuit-opening whenever the current relay 25 occupies its high-current position, corresponding to the lifting of the drilling tool.

Furthermore, in case it is desired to vary the voltage applied to the frequency-changer and, therefore, to the main motor during the drilling periods, the hand switch 174 in Fig. 6 may be closed to cause the energization of the actuating coils of the switches 159 and 160 when the current relay 25 occupies its upper position. In this case, the switches 159 and 160 are lifted to insert an additional section of the supply transformer 24 in circuit, whereby a higher voltage is applied to the motor during the tool-lifting periods. In this way, it is possible to vary the maximum or pull-out torque of the motor during the drilling operation as desired.

It will be understood that, in some cases, instead of employing the illustrated self-propelling type of frequency-changer, a direct mechanical connection of the frequency-changer to the motor may be employed to obtain similar results.

It will be seen that I have thus provided various control systems wherein combined primary and secondary circuit control is obtained to so adjust the operating characteristics of an oil-well drilling motor as to fit the motor particularly for this peculiar type of work. In addition, various other refinements of control have been described, some or all of which may desirably be included with the other feature in various drilling applications.

Furthermore, after all operations in connection with the drilling period have been completed, the supply transformer may be removed with other apparatus, the same motor that was employed for drilling, however, remaining for the pumping operation and being directly connected to the line.

I do not wish to be restricted to the specific structural details, circuit connections or arrangement of parts herein set forth, as various modifications thereof may be made without departing from the spirit and scope of my invention. I desire, therefore, that only such limitations shall be imposed as are indicated in the appended claims.

I claim as my invention:

1. In a control system for oil-well drilling and the like, the combination with an induction motor having a primary and a secondary winding, means for effecting a series of relatively small secondary-circuit resistance changes, means for further effecting a relatively large primary-winding voltage change, and differential-speed means for connecting said first two means.

2. In a control system for oil-well drilling and the like, the combination with an induction motor having a primary and a secondary winding, means for effecting a series of relatively small secondary-circuit resistance changes, means for following said series, with a relatively large primary-winding voltage change, and differential means connecting said first two means to cause the movement corresponding to said series of changes to equal the movement corresponding to said single voltage change.

3. In a control system for oil-well drilling and the like, the combination with an induction motor having a primary and a secondary winding, means embodying a differential driving mechanism for simultaneously regulating the primary-circuit voltage and the secondary-circuit resistance.

4. In a control system for oil-well drilling and the like, the combination with an induction motor having a primary and a secondary winding, means for regulating the primary-winding voltage, means for adjusting the secondary-circuit resistance, and differential speed means for connecting said regulating and said adjusting means.

In testimony whereof, I have hereunto subscribed my name this 5th day of August, 1920.

RUDOLF E. HELLMUND.